United States Patent [19]

Stallworth et al.

[11] 3,949,605
[45] Apr. 13, 1976

[54] ACOUSTIC CURRENT/FLOW MEASURING SYSTEM

[75] Inventors: Lewis A. Stallworth, East Lyme; Robert R. Hartley, Niantic, both of Conn.

[73] Assignee: The United States of America as represented by the Secretary of the Navy, Washington, D.C.

[22] Filed: July 2, 1974

[21] Appl. No.: 485,195

[52] U.S. Cl. .............. 73/194 A; 73/170 A; 73/189
[51] Int. Cl.² ..................................... G01F 1/66
[58] Field of Search ...... 73/194 A, 181, 189, 170 A

[56] References Cited
UNITED STATES PATENTS

| | | | |
|---|---|---|---|
| 2,928,277 | 3/1960 | Cavanagh et al. | 73/189 X |
| 3,435,677 | 4/1969 | Gardner | 73/189 |
| 3,633,415 | 1/1972 | Luce | 73/189 |
| 3,782,193 | 1/1974 | Meyer et al. | 73/181 |

Primary Examiner—Charles A. Ruehl
Attorney, Agent, or Firm—Richard S. Sciascia; Arthur A. McGill; Prithvi C. Lall

[57] ABSTRACT

A system for measuring flow of water in large bodies of water or in small pipes in which an acoustic signal is transmitted simultaneously via a radio transmitter-receiver system and a projector-hydrophone acoustic system. The electrical and acoustic signals transmitted are received at two preselected locations which are such that they form a right angle triangle with the point of origin of the signals as the vertex of the triangle. The velocity components of the fluid are measured by comparing the delay in time between the transmission of the electrical signal and the acoustic signal started simultaneously from the point of origin. The velocity of the fluid is then determined from the components of the velocity so determined.

6 Claims, 3 Drawing Figures

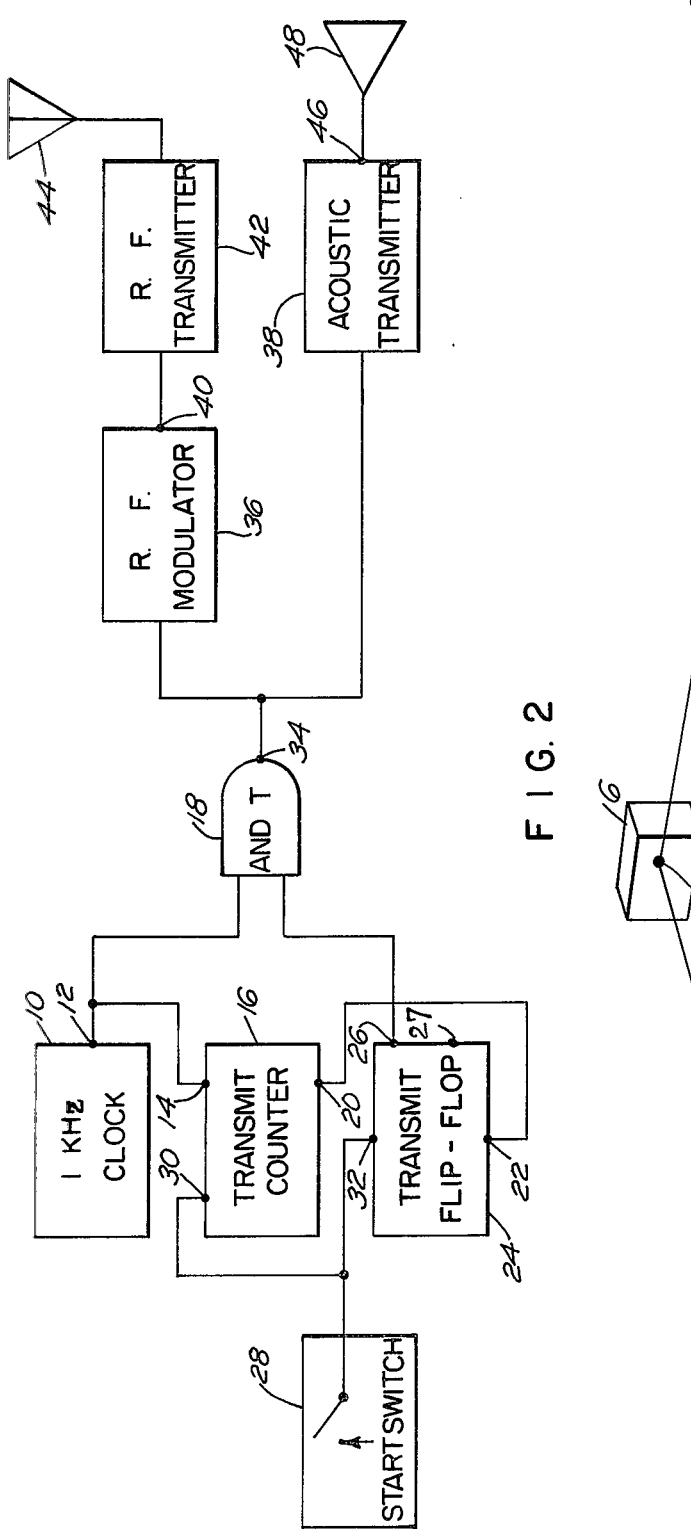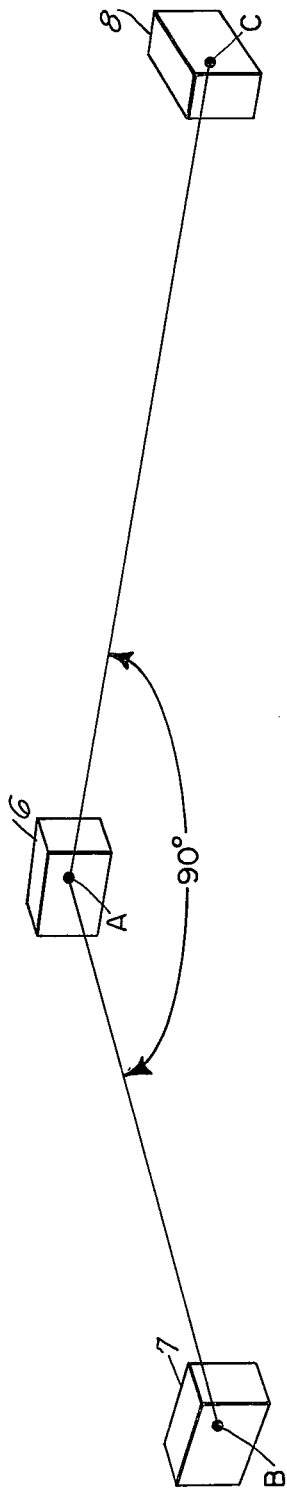
FIG. 2
FIG. 1

3,949,605

ACOUSTIC CURRENT/FLOW MEASURING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is related to a system for measuring velocity/flow of water in a large body of water or in a pipe and more specifically to determine the velocity/flow of water in rivers, bays, and ocean straits.

Previous methods of measuring fluid currents/flows require that a measuring device be placed at a point where such a measurement is desired. The prior art devices are either fixed electro-mechanical meters or neutrally buoyant objects which are allowed to move freely while being tracked from a known position. Another method used in the ocean is to measure the electric field induced across two electrodes when seawater, which acts as a conducting fluid, flows across a magnetic field. The magnitude of the induced electric field is related to the magnitude of a water flow. In all these prior art methods it is required that a measuring device be placed into the fluid at a given point and they yield a measurement at that point only. Furthermore, these methods are subject to calibration difficulties due to interference by seaweed, marine growths, corrosion and polarization of electrodes.

SUMMARY OF THE INVENTION

The objects and advantages of the present invention are accomplished by utilizing a system for measuring the velocity/flow of water in a large body of water. A signal is transmitted from a preselected point A to be received at two points B and C by using electrical and acoustical means. The points B and C are such that lines AB and AC are perpendicular to one another. The time difference between the arrivals of electromagnetic signal and the acoustic signal started simultaneously from point A and reaching either point B or C measures essentially the time taken by the acoustic signal from point A to B or A to C. Having measured the times taken by the acoustic signal to travel from A to B, B to A, A to C, and C to A, and knowing the distances AB and AC, one is able to calculate the velocity components of the water along AB and along AC. These components can then be combined to find the velocity of water in the large body of water. The measurement of time difference between the simultaneously transmitted electrical signal and the acoustic signal from A to reach either point B or point C is determined electronically by using electronic means.

An object of this invention is to use a system for accurately determining the velocity of water in a large body of water.

Another object is to use a system for determining velocity of water wherein an electromagnetic signal and an acoustic signal are transmitted from a point simultaneously.

Still another object is to eliminate interferences in the calibration of a system for measuring velocity of water in a large body of water.

Still another object is to use a system wherein the time delay between simultaneously transmitted electromagnetic signal and an acoustic signal from a point and received at another preselected point is measured accurately by using electronic means.

Other objects, advantages and novel features of the invention will become apparent from the following detailed description of the invention when considered in conjunction with the accompanying drawings wherein:

BRIEF DESCRIPTION OF THE DRAWINGS

FIG. 1 shows a block diagram of the system using three modules, each of the points A, B, and C having one of the three modules;

FIG. 2 shows a block diagram of the transmitter section of one of three modules of FIG. 1.

DESCRIPTION OF A PREFERRED EMBODIMENT

Figure 3:
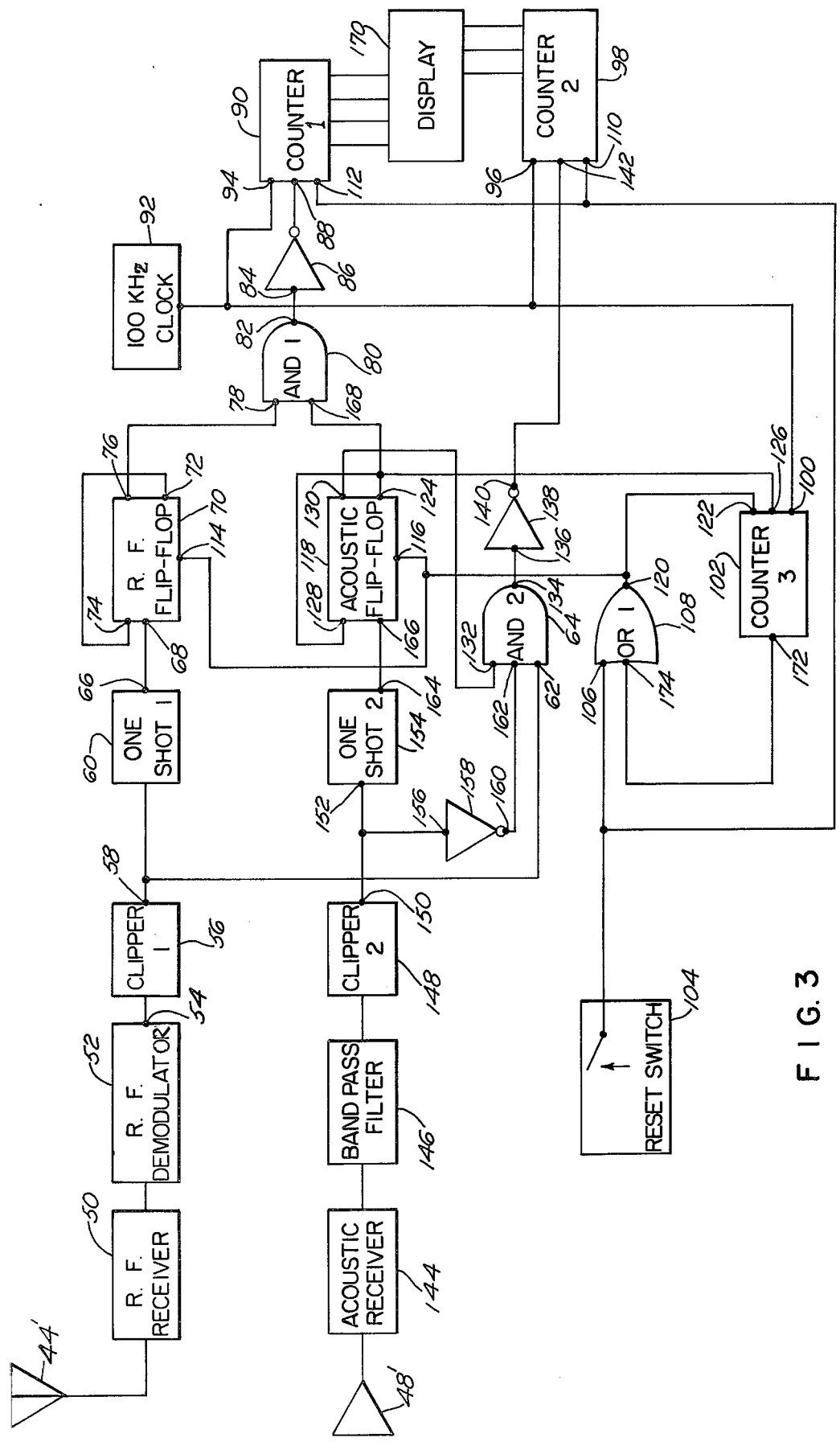
FIG. 3 shows a block diagram of the receiver section of one of three modules of FIG. 1.

A preferred embodiment of the system for measuring the time delay between an electromagnetic signal and a simultaneously transmitted acoustic signal by using electronic means is shown in FIGS. 1, 2, and 3, wherein like reference characters designate like parts throughout.

FIG. 1 shows a block diagram of the system wherein three similar transmitter-receiver modules or units 6, 7, 8 for transmitting and receiving electrical and acoustic signals are placed at points A, B, and C respectively. Points A, B, and C are located in the body of water where the water flow is to be determined and their positions are such that lines AB and AC are mutually perpendicular and horizontal.

FIG. 2 shows the transmit section of the electronic means of any one of the modules 6, 7, 8 and has a clock 10, preferably 1 KiloHertz, hereinafter called kHz, which generates electrical pulses at the rate of one pulse per millisecond (msec). The output of clock 10 at terminal 12 is fed into terminal 14 of a transmit counter 16 and also used as one of the inputs for an AND T circuit 18. After transmit counter 16 counts a preselected number of 1 kHz pulses from clock 10, it generates an output at its terminal 20 which is fed into terminal 22 of a transmit flip-flop 24. Terminal 26 of flip-flop 24 also provides the second input to AND T circuit 18. A logic start switch 28, a momentary switch, is connected to terminal 30 of transmit counter 16 and also to terminal 32 of transmit flip-flop 24. When logic start switch 28 is energized by pressing a push button, transmit counter 16 is reset and also transmit flip-flop 24 has a zero output at terminal 26, thus resetting the transmitter section of the module. Output of AND T circuit 18 at terminal 34 is fed into radio frequency (RF) modulator 36 and also into an acoustic transmitter 38. The output of RF modulator 36 at terminal 40 is fed into a RF transmitter 42 which transmits it by means of an RF antenna 44. The output of acoustic transmitter at terminal 46 is transmitted into the body of water by means of a transducer 48 which acts as an acoustic projector. It is to be noted that a transmitter section as shown in FIG. 2 is supplied at all reference points A, B, C of FIG. 1, and each of these reference points is also provided with a receiver section which is shown in FIG. 3.

An electromagnetic signal from RF antenna 44 is received by RF antenna 44' and is then fed into RF receiver 50 which in turn sends the signal to demodulator 52 for demodulation. The output of demodulator 52 at terminal 54 is clipped in a clipper circuit 56 and the output of the clipper circuit 56 at terminal 58 is fed to a one shot flip-flop, one shot 1 circuit 60, and also to terminal 62 of AND 2 circuit 64. Output of one shot 1 circuit 60 at terminal 66 is fed into terminal 68 of RF flip-flop 70 which has its terminals 72 and 74 connected together, making the flip-flop as a toggle switch. Terminal 76 of RF flip-flop 70 is connected to terminal 78 of AND 1 circuit 80. Output of AND 1 circuit 80 at terminal 82 is connected to the input terminal 84 of an inverter 86 which is connected to terminal 88 of counter 90. 100 kHz clock 92 is connected to terminal 94 of counter 90, to terminal 96 of counter 98, and to terminal 100 of counter 102. A reset switch 104, which is a momentary switch, is connected to terminal 106 of OR 1 circuit 108, to terminal 110 of counter 98, and to terminal 112 of counter 90. Reset terminal 114 of RF flip-flop 70 is connected to reset terminal 116 of acoustic flip-flop 118, to the output terminal 120 of OR 1 circuit 108, and to reset terminal 122 of counter 102. Terminal 124 of acoustic flip-flop 118 is connected to terminal 126 of counter 102 and is also connected to terminal 128 of acoustic flip-flop 118. Terminal 130 of flip-flop 118 is connected to terminal 132 of AND 2 circuit 64. Output terminal 134 of AND 2 circuit 64 is connected to the input terminal 136 of inverter circuit 138. Output terminal 140 of inverter 138 is connected to terminal 142 of counter 98. Transducer 48', acting as a hydrophone, receives the transmitted acoustic signal and feeds its output to acoustic receiver 144. The output of acoustic receiver 144 is filtered in a bandpass filter 146 and clipped in clipper circuit 148. Output of clipper circuit 148 at terminal 150 is fed into terminal 152 of a one shot 2 circuit 154 and is also connected to terminal 156 of an inverter circuit 158. Output of inverter 158 at terminal 160 is connected to terminal 162 of AND 2 circuit 64. Output terminal 164 of one shot 2 circuit 154 is connected to terminal 166 of acoustic flip-flop 118. Output of acoustic flip-flop 118 is also connected to terminal 168 of AND 1 circuit 80. Counters 90 and 98 are connected to a display unit 170 which reads the time delay between simultaneously transmitted electromagnetic signal and acoustic signal to reach a preselected point.

OPERATION OF THE SYSTEM

In its simplest form, the system comprises three identical units or modules, 6, 7, 8, located at points A, B and C respectively in the fluid medium, the motion of which is to be measured. Each unit or module is capable of transmitting and receiving radio frequency information through the air and simultaneously transmitting and receiving acoustic information through the fluid medium. The system described below is a manually-operated system, but it can be easily configured for automatic operation from a central location. Points A, B and C are so chosen in the fluid medium that lines AB and AC are mutually perpendicular and horizontal.

If the components of fluid velocity $v$ from A to B and A to C are denoted by $v_{AB}$, $v_{AC}$ respectively; average speed of sound in the fluid medium by $c$; the angle made by the velocity vector $v$ with line AB by $<\theta$; and the travel times from A to B, B to A, A to C, and C to A are denoted by $T_{AB}$, $T_{BA}$, $T_{AC}$, and $T_{CA}$ respectively; the following formulas are applicable:

$$T_{AB} = \frac{AB(\text{distance})}{c + v_{AB}} ; T_{AB} = \frac{AB(\text{distance})}{c - v_{AB}} \quad (1)$$

For $v_{AB}$ much smaller than $c$, $$T_{AB} \doteq \frac{AB}{c}(1 - v_{AB}/c) \quad (2)$$

$$T_{BA} \doteq \frac{AB}{c}(1 + v_{AB}/c) \quad (3)$$

$$\text{Thus } v_{AB} = \frac{c^2}{2(AB)}(T_{BA} - T_{AB}) \quad (4)$$

$$\text{If } c \text{ is constant, } c = \frac{2(AB)}{T_{AB} + T_{BA}} \quad (5)$$

$$v_{AB} = \frac{2(AB)(T_{AB} - T_{BA})}{(T_{AB} + T_B)^2} \quad (6)$$

The magnitude and direction of velocity relative to line AB is given by $$|v| = \left(v_{AB}^2 + v_{AC}^2\right)^{1/2} \text{ and } \tan \Theta = \frac{v_{AC}}{v_{AB}} \quad (7)$$

Prior to operation, power is supplied to all of the units or modules. Each of the units or modules becomes ready for operation upon manually depressing the reset switch 104, a momentary action switch, which places a "logic one" or "high" state pulse on the reset terminal of each of the flip-flops and places them in the reset state. The reset switch 104 also places a "logic one" or "high" state pulse on the reset of each of the counters to place them in the zero count state, i.e., counters all cleared and ready for counting.

To start the operation, one of the modules or units (as an example, module 6) is made to transmit a pulse train of a preselected duration of 1 kHz pulses through the air by modulated radio frequency and through the fluid medium under investigation by acoustic propagation. The length or duration of the pulse train of 1 kHz pulses is so chosen that its duration is longer than the time for the acoustic signal starting from the preselected transmitting module to reach the preselected receiving module. This is accomplished by manually depressing the start switch 28 as shown in FIG. 2. The start switch 28 is a momentary action switch which places a "logic one" or "high" state pulse on the reset terminal 30 of the transmit counter 16, a four-digit decade counter, to assure a zero start and places a "logic one" or "high" state pulse on the set input terminal 32 of the transmit flip-flop 24 causing it to go into the set position. The output at terminal 27 of the flip-flop 24 goes to a "logic one" or "low" state when the flip-flop 24 is set. This "logic one" or "low" state signal goes to the enable input of the transmit counter 16 which enables counter 16 to count 1 kHz pulses from 1 kHz clock 10. The output at terminal 26 of the transmit flip-flop 24 goes to the "logic one" or "high" state. This signal goes to the input of AND T circuit 18 and allows the 1 kHz pulses from 1 kHz clock 10 to go to the RF modulator 36 and to fluid acoustic transmitter 38 simultaneously.

The pulse train of selected duration of 1 kHz pulses is used to modulate a high radio frequency signal, acting as a carrier, in the RF modulator 36. The output of RF modulator 36 at terminal 40 is then transmitted by RF transmitter 42 through the RF antenna 44. Simultaneously, the pulse train of 1 kHz pulses is transmitted directly by the acoustic transmitter 38 by feeding its output at terminal 46 to the acoustic projector 48 and then into the flluid medium under test. Both the RF signals and the acoustic signals are received by the receiving sections of the other two units or modules (module 7 and module 8).

The RF signals and the acoustic signals are received by both units, module 7 and module 8. Since both of these units or modules are identical in operation, the operation of one of the units or modules is described here, although both of the units or modules operate simultaneously. For purposes of description provided below, the operation of unit 7 is selected and a block diagram of the receiving section of module 7 is shown in FIG. 3.

The transmitted RF signal is received by antenna 44' and is sent to the RF receiver 50, demodulated by the RF demodulator 52, and clipped by clipper 1 circuit 56, providing the terminal 58 of clipper 56 with a pulse train of nearly square wave pulses. The first pulse in the pulse train triggers one shot 1 circuit 60, a Retriggerable Monostable Multi-Vibrator, with a time constant long enough to hold the one shot 1 circuit 60 in the "logic one" or "high" state between incoming 1 kHz pulses of the pulse train. The "logic one" or "high" state signal on output terminal 66 of the one shot 1 circuit 60 is used as a clock pulse for RF flip-flop 70 which is an edge triggered C-D flip-flop. Since the RF flip-flop 70 had been set in the reset position previously, the output at terminal 72 will be in the "logic one" or "high" state. The "logic one" or "high" state signal on the input terminal 74 of the RF flip-flop 70 will cause it to go into the set condition when it receives the leading edge of the pulse from one shot 1 circuit 60.

The "logic one" or "high" state signal on the output terminal 76 of the RF flip-flop 70 will be gated through AND 1 circuit 80 since the other input to AND 1 gate 80 comes from the output terminal 124 of the acoustic flip-flop 118 and is normally in the "logic one" or "high" state. The output at terminal 8 of AND 1 circuit 80 is fed to terminal 84 of inverter circuit 86 and is inverted to form the enable signal at terminal 88 of counter 1 circuit 90 which is a six-digit decade counter. With the counter 90 enabled, the 100 kHz signal from the 100 kHz clock 92 is counted until the counter 90 is disabled.

The acoustic signal is received sometime after the RF signal is received. The acoustic signal is converted to an electrical output by acoustic hydrophone 48', amplified in acoustic receiver 144, filtered through bandpass filter 146, and clipped in clipper 2 circuit 148 to form another pulse train of nearly square wave pulses which are delayed both timewise and phase-wise from the pulses of the pulse train from the received RF signal. The first pulse in the pulse train triggers one shot 2 circuit 154 which is a retriggerable monostable multivibrator with a time constant long enough to hold one shot 2 circuit 154 in "logic one" or "high" state between the incoming 1 kHz pulses. The "logic one" output signal at terminal 164 of one shot 2 circuit 154 is used as a clock pulse for the acoustic flip-flop 118, an edge triggered C-D flip-flop. Since the acoustic flip-flop 118 had been set in the reset position previously, its output at terminal 124 will be "logic one". The "logic one" or "high" state signal on the input at terminal 128 of the acoustic flip-flop 118 will cause the flip-flop to go into the set condition with the leading edge of the pulse from the one shot 2 circuit 154, providing a "logic zero" or "low" state signal from output terminal 124 of the acoustic flip-flop 118. This "logic zero" or "low" state signal will turn off the AND 1 gate 80 and cause counter 1 circuit 90 to be disabled and latch the total count. The count latched in counter 90 is the number of 10 microsecond intervals between the receipt of the RF signal and the acoustic signal, giving a gross measurement of time.

In order to provide additional accuracy, the phase difference between 10 pulses of the RF signal and 10 pulses of the acoustic signal is measured and used to modify the gross time measurement described above. The duration of the pulse train which is set by the transmit counter 16 is such that the duration of the pulse train is slightly greater than the time taken by the acoustic signal to travel from a preselected transmitting location to a preselected receiving location. This ensures an overlap of the RF pulses and the acoustic pulses for phase difference determination. The acoustic flip-flop 118 is set, as described previously, by the receipt of the first pulse of the acoustic signal or the leading edge of the pulse coming from one shot 2 circuit 154. The output at terminal 124 of the acoustic flip-flop 118 which is normally in "logic one" or "high" state goes to "logic zero" or "low" state. The "logic zero" or "low" state signal at terminal 124 of the flip-flop 118 enables counter 3 circuit 102, a three-digit decade counter, which starts counting the 100 kHz pulses from the 100 kHz clock 92. The output at terminal 130 of the acoustic flip-flop 118 which is normally in "logic zero" or "low" state goes to the "logic one" or "high" state and thus places a "logic one" or "high" state signal on terminal 132 of AND 2 gate circuit 64 which will now react to signals on the other two inputs at terminals 162 and 62.

The other two inputs to AND 2 circuit 64 come from the two clippers, i.e., clipper 56 and clipper 148. One of these inputs comes directly from clipper 1 circuit 56 to terminal 62 of the AND 2 circuit 64 and the other input comes from clipper 2 circuit 148 to input terminal 156 of inverter circuit 158 with its output terminal 160 going to input terminal 162 of AND 2 circuit 64. This combination of inputs places a "logic one" or "high" state signal on the output terminal 134 of AND 2 circuit 64 whenever the output of clipper 1 circuit 56 is in the "high" state of the RF pulse train and clipper 2 circuit 148 is in the "low" state of the acoustic pulse train. The width of this pulse is then the analog of the phase difference between the two pulse trains, i.e., the RF pulse train and the acoustic pulse train. The output of AND 2 circuit 64 at terminal 134 is inverted by feeding it to input terminal 136 of inverter 138 and the output of the inverter 138 at terminal 140 being used to enable counter 2 circuit 98, a three-digit decade counter, which counts the 100 kHz clock pulses from clock 92 during the time it is enabled.

Counter 3 circuit 102, a three-digit decade counter, is enabled by the output at terminal 124 of the acoustic flip-flop circuit 118 when the flip-flop is in the set condition. Counter 3 circuit 102 counts the 100 kHz clock pulses for 1,000 counts, i.e., 10 milliseconds or 10 full pulses of the 1 kHz pulse train. At the 1,000 count, counter 102 puts out a 10 microsecond "logic one" or "high" state signal to OR 1 circuit 108 which resets the RF flip-flop circuit 70 by sending a reset pulse at its terminal 114, the acoustic flip-flop circuit 118 by sending a reset pulse at its terminal 116, and counter 3 circuit 102 by sending a pulse at terminal 122. Counter 1 circuit 90 and counter 2 circuit 98 remain latched until reset by the reset switch 104.

Display circuit 170 is a seven-digit display comprising seven segment LED displays. It displays the travel time difference between the arrival of the RF signal and the acoustic signal in microseconds. Display circuit 170 receives the outputs from the four most significant digits of counter 1 circuit 90 and displays the information as the four most significant digits of the display circuit 170. Circuit 170 also receives the three-digit information of counter 2 circuit 98 and displays it as the three least significant digits of the display circuit 170. Thus display circuit 170 measures time $T_{AB}$ in microseconds from which the value of $v_{AB}$ can be calculated. Similarly $v_{AC}$ can also be obtained to determine the magnitude and direction of velocity of the fluid medium at point A.

It should be pointed out that all electronic components used in the system are standard units and can be replaced by similar compatible units. As an example, the flip-flop circuits used are D type edge triggered flip-flop circuits such as Texas Instruments No. SN74H74.

Briefly stated, the magnitude and direction of velocity of a fluid medium is determined by using a module comprising an RF transmitting and receiving section and a transmitting and receiving acoustic section at a point A and locating one identical module at each of the two other points, B and C. These points are chosen so that they form a horizontal right angled triangle with right angle at point A. A pulse train of a preselected duration is sent from point A under investigation using RF signal means and also using acoustic means for the pulse train to travel to the remaining two points, B and C, simultaneously. The time difference between the arrival of the RF portion of the pulse train and the acoustic portion of the pulse train determines the time taken by the acoustic signal from one point to the other. From this determination of time, the velocity of the fluid medium is calculated.

Obviously many modifications and variations of the present invention are possible in the light of the above teachings. As an example, various modifications in the electronic circuitry and the components thereof are possible as long as the concept of transmitting simultaneously an electrical signal and an acoustic signal from one point to the other is preserved. It is therefore understood that within the scope of the appended claims the invention may be practiced otherwise than as specifically described.

We claim:

1. A flowmeter for measuring the flow of a fluid comprising:
   a least three identical transmitting and receiving modules for transmitting and receiving simultaneously generated acoustic and electrical signals from and by any of the modules thereof, each of said modules being located at a separate point in the fluid, the three points thus selected forming a generally right angled triangle in a horizontal plane with the right angle formed at one of said selected points, and means for using said simultaneously generated electrical and acoustic signals to determine time durations for the acoustic signals to travel back and forth from the selected point having the right angle formed thereon to the remaining two said selected points to compute the flow of the fluid by using said simultaneously generated electrical signals to initiate the measurement of said time durations upon arrival thereof at one of said remaining two selected points and to stop the measurement of said time durations upon arrival of said acoustic signals at said point of said remaining two selected points.

2. The flowmeter of claim 1 wherein each of said transmitting and receiving modules includes an electrical transmitter and an acoustic transmitter for generating said simultaneously generated acoustic and electrical signals for transmission through said fluid.

3. The flowmeter of claim 2 wherein each of said transmitting and receiving modules further comprises an acoustic receiver means and an electrical receiver means for receiving said simultaneously generated acoustic and electrical signals.

4. The flowmeter of claim 3 wherein each of said transmitting and receiving modules includes a 1 kHz clock being connected to a transmit counter and a transmit flip-flop for generating electrical pulses for generating said simultaneously generated acoustic and electrical signals.

5. The flowmeter of claim 4 wherein said electrical receiver means of each of said transmitting and receiving modules includes a R. F. receiver, a R. F. modulator, a clipper, a ONE SHOT 1 flip-flop, a R. F. flip-flop, an AND 1 circuit, and a plurality of counters for counting 100 kHz pulses from a pulser, all sequentially connected in series.

6. The flowmeter of claim 5 wherein said acoustic receiver means of each of said transmitting and receiving modules includes a hydrophone, a bandpass filter, a clipper 2, a ONE SHOT 2, an acoustic flip-flop, said AND 1 circuit, and said plurality of counters for counting 100 kHz pulses from said pulser, all sequentially connected in series.

* * * * *